Patented Dec. 21, 1926.

1,611,487

UNITED STATES PATENT OFFICE.

EARL B. PUTT, OF NEW YORK, N. Y.

MEDICAMENT.

No Drawing. Application filed July 16, 1926. Serial No. 123,013.

This invention relates to medicaments, and more particularly to medicaments containing an -iodo-benzoic acid, preferably ortho-iodo-benzoic acid.

An important object of this invention is to provide a medicament for use as a source of organic iodine in the treatment of goitre, pyorrhœa, or other conditions in which the application of iodine in a nonirritating form is advisable.

Another object of this invention is to provide a novel medicament for treating pyorrhœa comprising chewing gum and a material suitable for treating pyorrhœa.

At the present time iodine is generally administered in the form of simple iodide or organic iodine compounds, but the use of many of such compounds is attended with numerous disadvantages. For example, simple iodides, such as potassium iodide are promptly excreted up to 80 per cent in the urine and have a marked irritant action in many ways. Moreover most organic iodine compounds are notably offensive in taste or odor and therefore, do not readily lend themselves to internal administration.

I have discovered that by using an iodo-benzoic acid, preferably the ortho-compound, I avoid the above mentioned disadvantages. This compound has the general formula $C_6H_4.I.COOH$ and contains over 50 per cent iodine but does not have the disagreeable taste of many organic iodine compounds. It does not split off its iodine when incorporated into gum, tablets, or other convenient medicinal vehicles. When taken into the system iodine is not excreted as iodides in the urine, and the material itself is nonirritating and is not toxic.

The iodo-benzoic acid which I employ may be administered satisfactorily in a slowly dissolving tablet, lozenge, solution in solvents, or any other convenient medicinal vehicles. In such a manner the compound can readily be mixed with the saliva of the mouth and is a pleasant way to take iodine. When so administered the compound is physiologically harmless as compared with other organic iodine compounds.

I have further discovered that in the treatment of pyorrhœa the incorporation of a pyorrhœa treating material into chewing gum is highly advantageous. The chewing gum cooperates with the pyorrhœa treating material in a novel manner, hereinafter to be described, so that the material is slowly liberated from the chewing gum and is brought into intimate contact with the diseased portion of the gum. Upon the mastication of the chewing gum, the diseased gum is massaged in such a manner that the material may readily act upon the diseased portion of the gum which will be partially exposed by the massaging action of the chewing gum. Furthermore, the pyorrhœa treating material will be slowly liberated from the chewing gum so that the action of the material on the gum may be prolonged over a considerable period. Furthermore, by incorporating a pyorrhœa treating material into chewing gum a pleasant manner of treating the affected gums is provided.

While I propose to incorporate an iodo-benzoic acid, preferably ortho-iodo-benzoic acid, into the chewing gum, my invention contemplates incorporating any other suitable pyorrhœa treating material into such chewing gum. When employing iodo-benzoic acid in chewing gum for the purpose of treating pyorrhœa the dose of such compound is approximately one-third grain to each piece of gum.

Besides the advantages of the use of an iodo-benzoic acid for supplying the iodine deficiency of the body and for its local effect in the mouth on pyorrhœa, I have discovered that this compound is highly advantageous for its local antiseptic action when applied locally as in suppositories, douches, or irrigations.

While I have described in detail the preferred embodiment of my invention, it is to be understood that the details of procedure, and proportion of ingredients may be widely varied without departing from the spirit of the invention or the scope of the subjoined claims.

I claim:

1. A medicament for treating pyorrhœa and conditions of iodine deficiency, and for local antiseptic action and the like, comprising an iodo-benzoic acid.

2. A medicament for treating pyorrhœa and conditions of iodine deficiency, and for local antiseptic action and the like, comprising ortho-iodo-benzoic acid.

3. A medicament comprising a carrier and an iodo-benzoic acid, said medicament being adapted to slowly liberate the iodo-benzoic acid in the mouth.

4. A medicament comprising a carrier and ortho-iodo-benzoic acid, said medicament being adapted to slowly liberate the ortho-iodo-benzoic acid in the mouth.

5. A masticatory medicament comprising a gummy material and an iodo-benzoic acid, said medicament being adapted to slowly liberate the iodo-benzoic acid in the mouth when chewed.

6. A masticatory medicament comprising chewing gum and an iodo-benzoic acid, said medicament being adapted to slowly liberate the iodo-benzoic acid in the mouth when chewed.

7. A masticatory medicament comprising chewing gum and ortho-iodo-benzoic acid, said medicament being adapted to slowly liberate the ortho-iodo-benzoic acid in the mouth when chewed.

In testimony whereof I affix my signature.

EARL B. PUTT.